(12) United States Patent
Stanienda

(10) Patent No.: US 6,561,312 B2
(45) Date of Patent: May 13, 2003

(54) DEVICE FOR IN PARTICULAR ACOUSTICALLY UNCOUPLED MOUNTING

(75) Inventor: Henryk Stanienda, Huelben (DE)

(73) Assignee: Elring Klinger AG, Dettingen (DE)

( * ) Notice: Subject to any disclaimer, the term of this patent is extended or adjusted under 35 U.S.C. 154(b) by 122 days.

(21) Appl. No.: 09/804,437

(22) Filed: Mar. 12, 2001

(65) Prior Publication Data

US 2001/0037911 A1 Nov. 8, 2001

(30) Foreign Application Priority Data

May 3, 2000 (DE) .......................... 100 21 575

(51) Int. Cl.⁷ .............................. F16F 15/00; F16F 7/00; G10K 11/00; B60K 8/00
(52) U.S. Cl. ....................... 181/207; 181/208; 181/209; 181/175; 180/300; 267/141.2
(58) Field of Search ................... 181/175, 207–209, 181/198, 200–205, 295; 248/638; 267/141.2; 180/300; 411/544, 44, 970

(56) References Cited

U.S. PATENT DOCUMENTS

| 2,828,095 A | * | 3/1958 | Beck et al. ................. 248/612 |
| 2,893,722 A | * | 7/1959 | Beck ....................... 174/153 R |
| 3,675,881 A | | 7/1972 | Caldwell ........................ 248/9 |
| 4,066,058 A | * | 1/1978 | Anderkay ................... 267/141 |
| 4,213,718 A | * | 7/1980 | Lumby ........................ 248/635 |
| 4,306,708 A | * | 12/1981 | Gassaway et al. ..... 267/140.13 |
| 4,530,491 A | * | 7/1985 | Bucksbee et al. ............ 248/635 |
| 4,858,880 A | * | 8/1989 | Durand ........................ 248/634 |
| 4,921,203 A | * | 5/1990 | Peterson et al. ............ 248/635 |
| 5,547,172 A | * | 8/1996 | Corcoran .................... 267/141 |
| 5,609,329 A | * | 3/1997 | Scholl .................... 123/198 E |
| 5,743,509 A | * | 4/1998 | Kanda et al. ............ 267/140.3 |
| 6,302,385 B1 | * | 10/2001 | Summers et al. ........ 267/140.3 |

FOREIGN PATENT DOCUMENTS

| DE | 42 28 625 C1 | 3/1994 |
| EP | 0 936 363 A2 | 8/1999 |
| GB | 2 176 863 A | 1/1987 |

* cited by examiner

Primary Examiner—Robert E. Nappi
Assistant Examiner—Patrick Miller
(74) Attorney, Agent, or Firm—Michael J. Striker

(57) ABSTRACT

An arrangement for acoustically uncoupled mounting of slightly vibrating components on an anchoring part has a first sleeve which is adapted to guide through an opening of a component, a mounting screw which extends through the first sleeve, an uncoupling element adapted to be arranged between the component and the anchoring part, a second sleeve mounted coaxially to the first sleeve, a ring-shaped disc provided on each end of each of the sleeves, so that one of the discs is locatable between the anchoring part and the component at the other of the disc is locatable between the component and a head of the screw, the uncoupling element being adapted to be arranged between the component and a disc facing the anchoring part.

7 Claims, 1 Drawing Sheet

DEVICE FOR IN PARTICULAR ACOUSTICALLY UNCOUPLED MOUNTING

BACKGROUND OF THE INVENTION

The present invention relates to a device for in particular acoustically uncoupled mounting of slightly vibratable components on an anchoring part, in particular thermal shields in motor vehicles with a sleeve which is guided through an opening in a component, through which a mounting screw is extended, and with at least one uncoupling element arranged between the component and the anchoring part.

When in the arrangements of the above mentioned type, the mounting screw is tightened too much, the uncoupling element is compressed very much, and thereby its damping properties are affected. Therefore in the devices of the above mentioned general type it is also important that the mounting personnel take care that the mounting screw is tightened only so far that a reliable mounting is guaranteed and simultaneously the damping properties of the at least one uncoupling element are not significantly affected.

SUMMARY OF THE INVENTION

Accordingly, it is an object of the present invention to provide a device of the above mentioned general type, which is improved in that its mounting and use are substantially simplified.

In keeping with these objects and with others which will become apparent hereinafter, one feature of present invention resides, briefly stated, in an arrangement of the above mentioned general type, in which a second sleeve is mounted coaxially in the first sleeve, and on at least one end of both sleeves a ring-shaped disc is arranged, so that one disc is arranged between the anchoring part and the component, and the other disc is arranged between the component and the screw head, while at least one uncoupling element is mounted between the heat shield and the disc which faces the anchoring part.

Since the end of the outer sleeve without disc abuts against the disc connected with the inner sleeve, the uncoupling element by excessive tightening of the mounting screw can be compressed only to a very limiting extent. Finally, during the connection of the component and the anchoring part with the mounting screw, simultaneously an optimal acoustic uncoupling between the component and the anchoring part is obtained, which can not be affected by the operator's failure.

For optimization of the acoustically uncoupling between the component and the anchoring part, for example a second uncloupling element can be mounted between the disc which faces the screw head, on the one hand, and the component, on the other hand.

The screw, the inner sleeve, the disc which faces the screw and the second uncoupling element and/or the outer sleeve, the at least one uncoupling element and the disc which faces the anchoring part can be mounted correspondingly to form a single structural assembly. Thereby these components can be prefabricated to be ready for mounting as two complete structural assemblies, so that the whole manufacture is performed in a rational way, which constitutes a further advantage.

For realization of premounting, the both sleeves can be plugged into one another with a press fit, and the mounting screw can be non-releasably premounted by pre-pressing with sleeve. Thereby, the whole device can be premounted on the component in a non releasable manner, so that for mounting of the component of the anchoring part it is only necessary to insert the screw into openings provided in the anchoring part for this purpose, and then to tighten the screws.

An especially good damping effect is obtained with at least one uncoupling element, when it is composed of an elastomer.

The inventive device is suitable in particular for acoustically uncoupled mounting of components. However, it can be utilized with the same advantages for other types of mounting.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
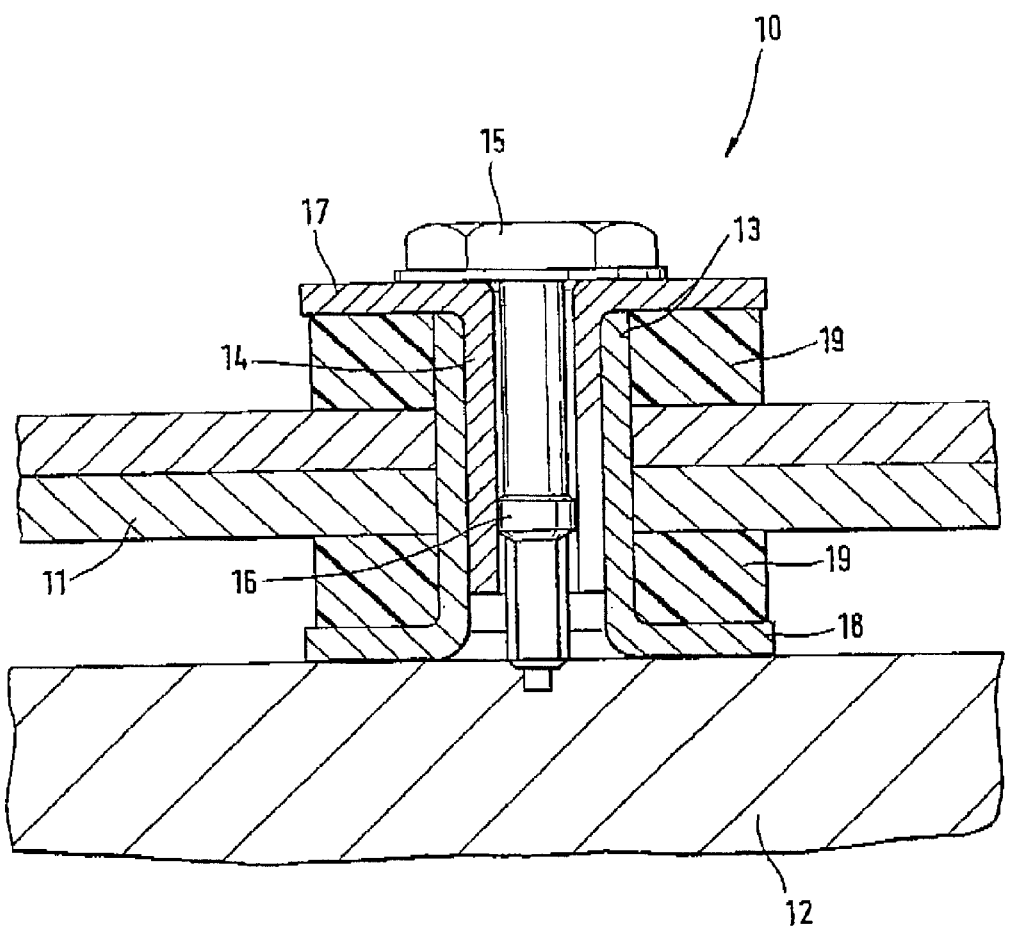
FIG. 1 is a view illustrating a device for acoustic uncoupled mounting of vibrating components.

The device in accordance with the present invention is identified with reference numeral 10. It is provided for acoustic uncoupled mounting of a slightly vibrating component 11 with an anchoring part 12. The anchoring part 12 can be a heat shield of a motor vehicle.

A sleeve 13 is extended through an opening of the component 11. A further sleeve 14 is inserted in the sleeve 13. A mounting screw 15 is non-releasably mounted in the sleeve 14 by pro-pressing with the sleeve 14. For improved prepressing, the screw 15 is provided at its shaft with a circumferential head 16. A corresponding uncoupling element 18 is provided between a disc 17 which is arranged on the sleeve 14 on the one hand and the component 11 on the other hand, and also between a disc 18 arranged on the sleeve 13 on the one hand and the component 11 on the other hand.

The uncoupling element 19 dampens vibrations of the component 11, whereby their transmission to the anchoring part 12 is reduced. The sleeve 13 abuts with its end which has no disc, against the disc 17 arranged on the sleeve 14. Thereby during tightening of the screw 15, an arbitrarily strong compression of the uncoupling element 19 is prevented. The thusly resulting low compression of the uncoupling element 19 is required for an optimal damping action.

The sleeves 13 and 14 can be plugged into one another with a press fit. The uncoupling element 19 can be connected fixedly with the discs 17 and 18. Together with the prepressing of the screw 15 with the sleeve 17, the arrangement can be formed so as to provide a premounted structure assembly.

It will be understood that each of the elements described above, or two or more together, may also find a useful application in other types of constructions differing from the types described above.

While the invention has been illustrated and described as embodied in device for in particular acoustically uncoupled mounting, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for acoustically uncoupled mounting of slightly vibrating components on an anchoring part, comprising a first sleeve which is adapted to guide through an opening of a component; a mounting screw which extends through said first sleeve; and uncoupling element adapted to be arranged between the component and the anchoring part; a second sleeve mounted coaxially to said first sleeve, wherein said first and second sleeves have different diameters and no threads; a ring-shaped disc provided on each end of each of said sleeves, so that one of said ring-shaped discs is locatable between the anchoring part and the component and the other of said ring-shaped discs is locatable between the component and a head of said mounting screw, said uncoupling element being adapted to be arranged between the component and the ring-shaped disc facing the anchoring part, and wherein said mounting screw is secured only to the anchoring part and is not secured to the first sleeve or second sleeve.

2. The arrangement as defined in claim 1, and further comprising a second uncoupling element mountable between one of said ring-shaped discs which faces said head of said mounting screw on the one hand and the component on the other hand.

3. The arrangement as defined in claim 2, wherein said mounting screw, said inner sleeve, said ring-shaped disc which faces said mounting screw and said second uncoupling element and/or said outer sleeve, said at least one coupling element and said ring-shaped disc facing the anchoring part are assembled to form a structural assembly.

4. The arrangement as defined in claim 1, wherein both sleeves are plugged into one another with a pressure fit.

5. The arrangement as defined in claim 1, wherein said mounting screw is arranged non-releasably.

6. The arrangement as defined in claim 5, wherein said non-releasable mounting screw is pressed with said inner sleeve.

7. The arrangement as defined in claim 1, wherein said at least one uncoupling element is composed of an elastomer.

* * * * *